US008767037B2

(12) United States Patent
Krishnan et al.

(10) Patent No.: US 8,767,037 B2
(45) Date of Patent: Jul. 1, 2014

(54) SYSTEMS AND METHODS FOR PANORAMIC IMAGING

(75) Inventors: Gurunandan Krishnan, New York, NY (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 913 days.

(21) Appl. No.: 12/726,029

(22) Filed: Mar. 17, 2010

(65) Prior Publication Data

US 2011/0018964 A1   Jan. 27, 2011

Related U.S. Application Data

(63) Continuation of application No. PCT/US2008/077258, filed on Sep. 22, 2008.

(60) Provisional application No. 60/974,338, filed on Sep. 21, 2007.

(51) Int. Cl.
G09G 3/12 (2006.01)
G02B 13/06 (2006.01)
H04N 5/232 (2006.01)
G06T 3/40 (2006.01)
H04N 5/225 (2006.01)

(52) U.S. Cl.
CPC ............ *G02B 13/06* (2013.01); *H04N 5/23238* (2013.01); *H04N 5/2259* (2013.01); *H04N 5/2254* (2013.01); *G06T 3/4038* (2013.01)
USPC ................... 348/36; 348/37; 348/38; 348/39; 348/69; 359/725; 396/436

(58) Field of Classification Search
CPC ... G02B 13/06; H04N 5/2628; H04N 5/2259; H04N 5/23238; H04N 5/2254; G06T 3/4038
USPC ................... 348/36, 37–39; 352/69; 359/725; 396/436
See application file for complete search history.

(56) References Cited

U.S. PATENT DOCUMENTS 5,703,604 A * 12/1997 McCutchen .................... 345/8
5,721,585 A *  2/1998 Keast et al. ................... 348/36

(Continued)

FOREIGN PATENT DOCUMENTS

WO        WO0122728          3/2001
WO        WO 0122728 A1 *    3/2001 ............. H04N 5/225

OTHER PUBLICATIONS

Brown et al, Automatic Panoramic Image Stitching using Invarient Features, 2007.*

(Continued)

*Primary Examiner* — Andy Rao
*Assistant Examiner* — Shan Elahi
(74) *Attorney, Agent, or Firm* — Baker Botts, L.L.P.

(57) ABSTRACT

Systems and techniques for panoramic imaging are disclosed herein. Systems for capturing a panoramic image of a panoramic field of view include a fisheye lens having a first field of view, a mirror optically coupled to the fisheye lens for reflecting an image of the a second field of view through the fisheye lens, the second field of view having a portion overlapping the first field of view, and a detector, optically coupled to the fisheye lens and the mirror, for capturing a first portion of the panoramic image corresponding to the first field of view and a second portion of the panoramic image corresponding to the second field of view.

22 Claims, 6 Drawing Sheets

(56) References Cited

U.S. PATENT DOCUMENTS

| | | | |
|---|---|---|---|
| 5,790,181 | A | 8/1998 | Chahl et al. |
| 5,841,589 | A | 11/1998 | Davis et al. |
| 5,973,726 | A * | 10/1999 | Iijima et al. ............... 348/38 |
| 5,987,164 | A * | 11/1999 | Szeliski et al. ............. 382/154 |
| 6,009,190 | A * | 12/1999 | Szeliski et al. ............. 382/154 |
| 6,111,595 | A * | 8/2000 | Hertrich ..................... 348/22 |
| 6,141,034 | A * | 10/2000 | McCutchen ................ 348/36 |
| 6,222,683 | B1 | 4/2001 | Hooglan et al. |
| 6,344,893 | B1 * | 2/2002 | Mendlovic et al. ......... 356/3.14 |
| 6,449,103 | B1 * | 9/2002 | Charles ...................... 359/725 |
| 6,665,003 | B1 * | 12/2003 | Peleg et al. ................. 348/36 |
| 6,704,434 | B1 * | 3/2004 | Sakoh et al. ................ 382/104 |
| 6,791,598 | B1 | 9/2004 | Luken et al. |
| 6,813,391 | B1 * | 11/2004 | Uyttendaele et al. ....... 382/284 |
| 6,947,059 | B2 * | 9/2005 | Pierce et al. ................ 345/629 |
| 7,123,777 | B2 | 10/2006 | Rondinelli et al. |
| 7,466,481 | B2 | 12/2008 | McCabe |
| 8,189,855 | B2 * | 5/2012 | Opalach et al. ............. 382/100 |
| 8,384,789 | B2 | 2/2013 | Chao et al. |
| 2002/0057337 | A1 * | 5/2002 | Kumler ....................... 348/47 |
| 2003/0090496 | A1 * | 5/2003 | Cahill et al. ................ 345/646 |
| 2003/0090586 | A1 * | 5/2003 | Jan et al. .................... 348/335 |
| 2003/0117488 | A1 * | 6/2003 | Pierce et al. ................ 348/48 |
| 2003/0133008 | A1 * | 7/2003 | Stephenson ................. 348/47 |
| 2003/0234866 | A1 * | 12/2003 | Cutler ......................... 348/207.1 |
| 2004/0027451 | A1 | 2/2004 | Baker |
| 2004/0167671 | A1 * | 8/2004 | Aoyama ...................... 700/259 |
| 2004/0227829 | A1 | 11/2004 | Wixson et al. |
| 2004/0263611 | A1 * | 12/2004 | Cutler ......................... 348/36 |
| 2005/0270660 | A1 | 12/2005 | Chen et al. |
| 2007/0182812 | A1 | 8/2007 | Ritchey |
| 2007/0237426 | A1 * | 10/2007 | Xie et al. .................... 382/305 |
| 2008/0024594 | A1 * | 1/2008 | Ritchey ....................... 348/36 |
| 2008/0049123 | A1 * | 2/2008 | Gloudemans et al. ....... 348/239 |
| 2009/0063307 | A1 | 3/2009 | Groenovelt et al. |
| 2011/0211039 | A1 | 9/2011 | Nayar et al. |

OTHER PUBLICATIONS

Lowe et al, Distinctive Image Features from Scale-Invariant Keypoints, 2004.*

Liu et al, Real-Time Wraps for Improved Wide-Angle Viewing, Nov. 2002.* http://www.kickstarter.com/projects/1106196796/the-gopano-micro-a-lens-for-capturing-360-video-on.

http://www.eyesee360.com/gopano/index.

http://www.eyesee360.com/gopano/specs.

http://www.eyesee360.com/gopano/accessories.

http://www.eyesee360.com/gopano/documentation/.

httc://www.eyesee360.com/gopano/docurnentation/GoPanoPlusQuickStartVer1Web.pdf.

Brown, M. and Lowe, D.G., "Automatic Panoramic Image Stitching using Invariant Features.", International Journal of Computer Vision, vol. 74, No. 1, pp. 59-73, Aug. 2007, URL:http://www.cs.ubc.ca/~lowe/papers/07brown.pdf.

International Search Report of PCT/US08/077258, Nov. 11, 2008.

U.S. Appl. No. 13/092,591, May 2, 2013, Non-Final Office Action.

Hua, et al., "Design analysis of a high-resolution panoramic camera using conventional imagers and a mirror pyramid", *IEEE Transactions on Pattern Analysis and Machine Intelligence,* 29(2):356-361 (2007).

U.S. Appl. No. 13/092,591, Feb. 24, 2014 Amendment and Request for Continued Examination (RCE).

U.S. Appl. No. 13/092,591, Nov. 22, 2013 Final Office Action.

Fiala, et al., "Panoramic Stereo Reconstruction Using Non-SVP Optics", *IEEE,* 4 pages (2002).

\* cited by examiner

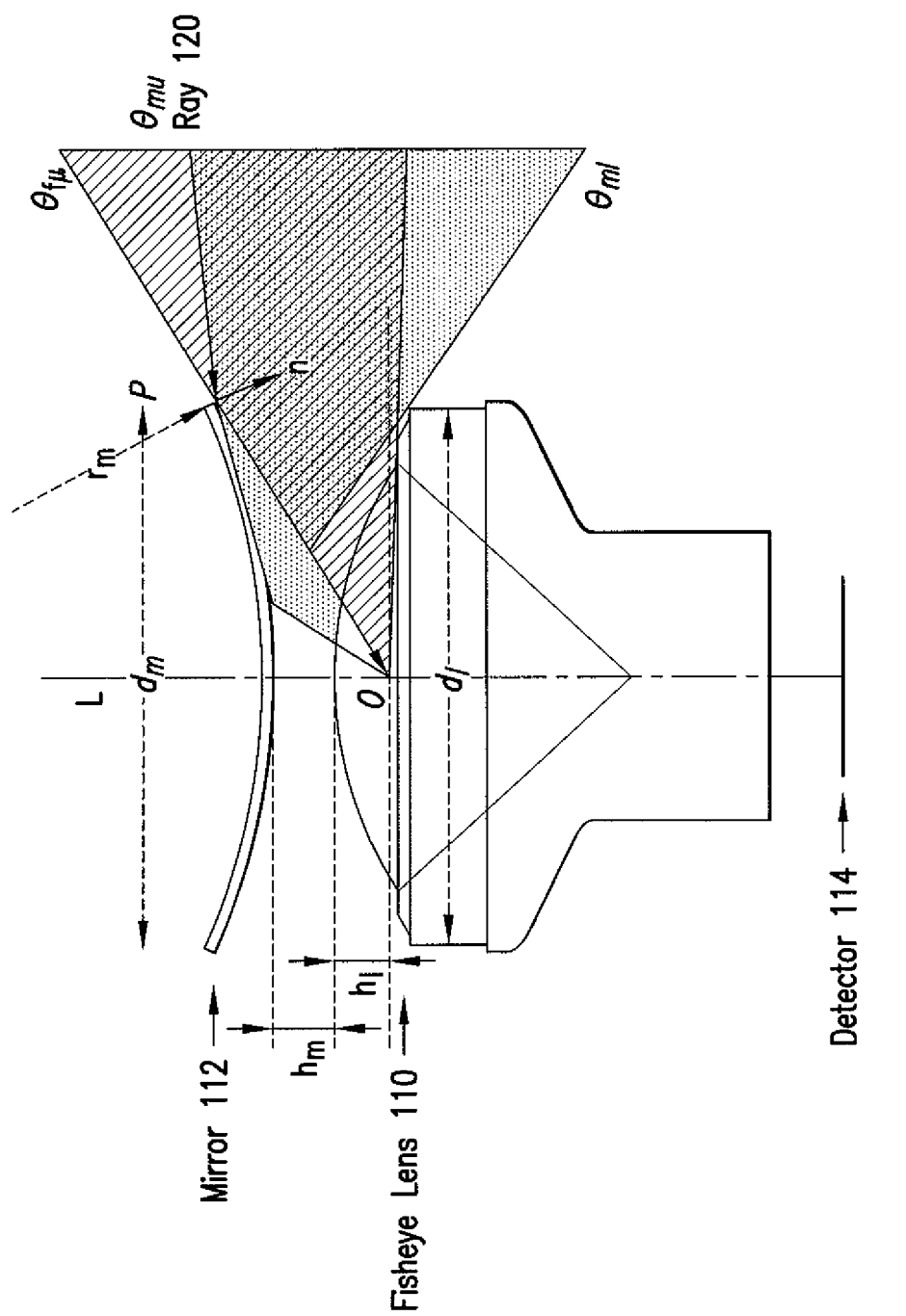

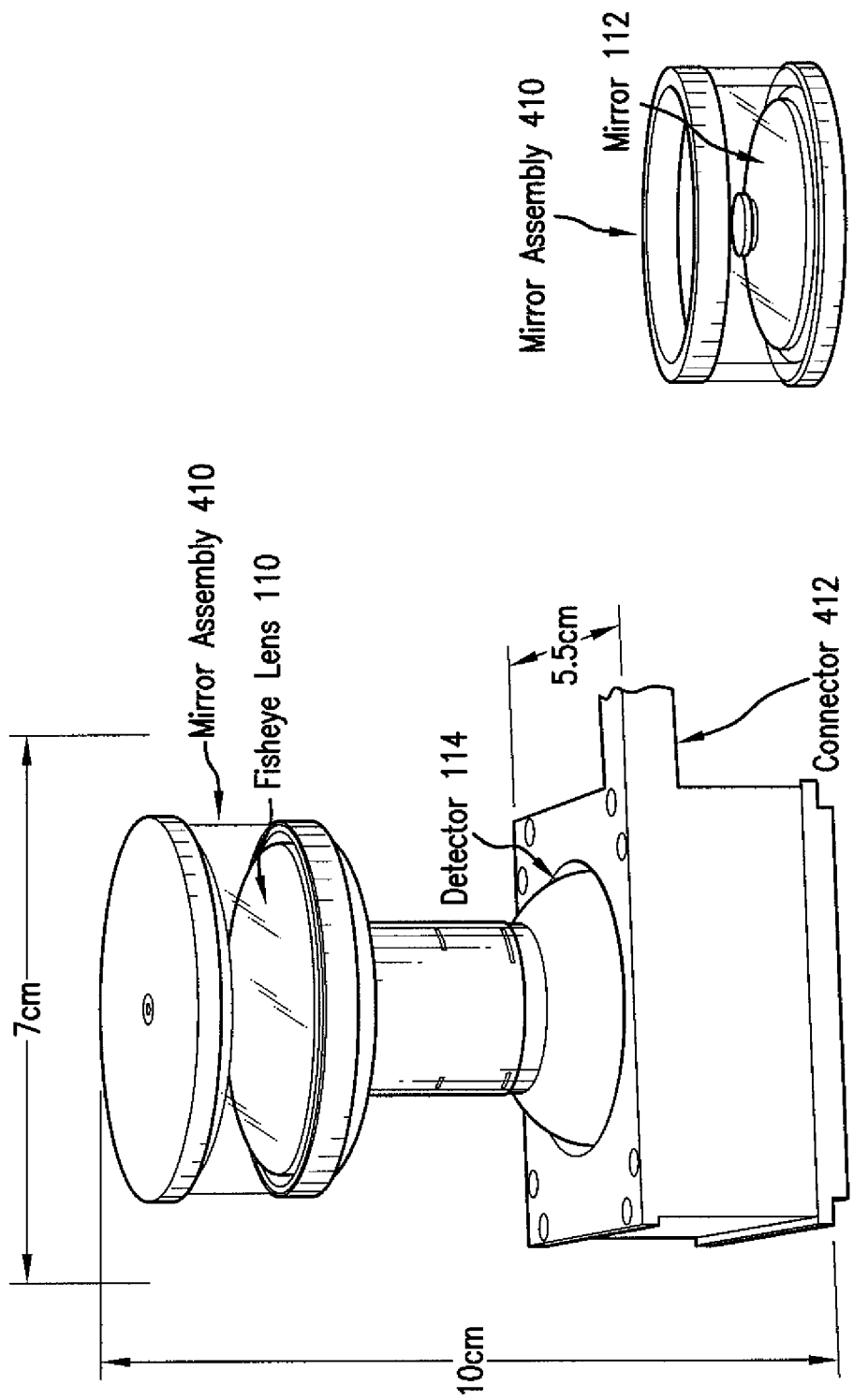

SYSTEMS AND METHODS FOR PANORAMIC IMAGING

CROSS REFERENCE TO RELATED APPLICATIONS

This application is a continuation of International Application PCT/US08/077,258, entitled "Systems And Methods For Panoramic Imaging", filed on Sep. 22, 2008, which claims priority to U.S. Provisional Application No. 60/974,338 entitled "Cata-Fisheye Camera for Panoramic Imaging", filed on Sep. 21, 2007, the contents of which are hereby incorporated by reference in their entirety.

STATEMENT REGARDING FEDERALLY-SPONSORED RESEARCH

This invention was made with government support under N00014-05-1-0032 awarded by the Office of Naval Research. The government has certain rights in the invention.

BACKGROUND

1. Field

The present application relates to systems and methods for panoramic imaging.

2. Background Art

Wide-angle and panoramic imaging have had significant impact on a variety of real-world applications. For example, being able to "see" in all directions provides situational awareness in surveillance and autonomous navigation tasks. Image-based immersive virtual reality enables realistic exploration of indoor and outdoor environments. Panoramic video conference and telepresence devices aid in effective virtual collaboration. All these applications rely on capturing high-quality panoramic videos. In many of these applications, it is not required to capture the entire spherical field of view (FOV). It is sufficient to capture 360 degree panoramas with a reasonable vertical field of view that has more or less equal coverage above and beneath the horizon. For instance, in the case of video conferencing, it is only necessary to capture the sitting participants and the table. The same is true for ground navigation, where the vehicle only needs to view the roads and the obstacles around it.

Current techniques for capturing panoramic videos can be classified as either dioptric (systems that use only refractive optics) or catadioptric (systems that use both reflective and refractive optics). Dioptric systems include camera-clusters and wide-angle or fisheye lens based systems. Catadioptric systems include ones that use single or multiple cameras with one or more reflective surfaces.

A popular dioptric solution is the use of fisheye lenses. Since fisheye lenses have a hemispherical FOV, fisheye lenses can only be used to capture hemispherical panoramas. D. Slater, "Panoramic Photography with Fisheye Lenses", *International Association of Panoramic Photographers*, 1996, proposed the use of two back-to-back fisheye lens cameras to obtain full spherical panoramas. Similar to camera-cluster approaches, this approach suffers from large parallax. In addition, if the goal is to capture a reasonable vertical coverage about the horizon then in terms of optics, image detection and bandwidth, it is wasteful to capture the entire sphere.

Catadioptric system employ one or more reflective surfaces capable of projecting a wide view of the world onto a single sensor. Several of these designs satisfy the so-called single viewpoint (SVP) constraint (e.g., that the entire image appears to be capture from a single point of reference). S. Baker and S. Nayar, "A Theory of Single-Viewpoint Catadioptric Image Formation", *IJCV*, 35(2):175-196, 1999, derived a family of mirrors that satisfy the SVP constraint, when used with perspective lenses. Since in these designs perspective cameras view the world through highly curved reflective surfaces, the vertical resolution (number of pixels per unit elevation angle) of the computed panoramas is not uniform and is, in general, poor near the apex of the mirror.

Yagi and Kawato, "Panorama Scene Analysis with Conic Projection," *IEEE International Workshop on Intelligent Robots and Systems*, Vol. 1, pp. 181-187, 1990, and Lin and Bajsey, "True Single View Point Cone Mirror Omni-Directional Catadioptric System, *ICCV*, pp. II: 102-107, 2001, have used conical mirrors in their catadioptric designs, with the latter satisfying the SVP constraint. In these examples, a better vertical resolution is obtained. The conical mirror acts as a planar mirror in the radial direction and hence the vertical resolution is the same as that of the camera. However, this restricts the maximum vertical FOV of the panorama to half the FOV of the camera. For instance, if the goal was to capture a panorama with a 60 degree vertical field of view, the camera must have a 120 degree field of view. Even if such a system is used, the resolution of the panorama approaches zero at the apex of the cone. More importantly, conical mirrors are known to produce strong optical aberrations due to astigmatism that fundamentally limit the resolution of the captured panorama. Thus, there is a need for improved systems and methods for capturing panoramic images.

SUMMARY

Systems and methods for capturing a panoramic image of a field of view are disclosed herein. An exemplary system of the disclosed subject matter for capturing a panoramic image of a field of view includes a fisheye lens, a mirror optically coupled to the fisheye lens for reflecting an image of the field of view through the fisheye lens, and a detector, optically coupled to the fisheye lens and the mirror, for capturing the panoramic image. In some embodiments, the mirror is a spherical mirror and can be positioned coaxially with regard to the fisheye lens. In some embodiments, the system is further configured to satisfy the following conditions that the upper angle of a desired field of view is equal to the upper angle of a field of view of the fisheye lens, the lower angle of the desired field of view is less than or equal to the lower angle of a field of view of the mirror, and the angle of overlap between the field of view of the mirror and the field of view of the fisheye lens is equal to the difference between the lower angle of the field of view of the fisheye lens and the upper angle of the field of view of the mirror.

The system for panoramic imaging can further include a processor and a memory storing program instructions to cause the processor utilize the detector to capture a first portion of the image of the field of view transmitted directly through the fisheye lens, and capture a second portion of the image of the field of view reflected from the mirror through the fisheye lens. In some embodiments, the memory stores program instructions that when executed by the processor, further cause the processor to stitch together the first portion of the captured image and the second portion of the captured image to form a panoramic image. In some embodiments, the stitching together of the first portion of the captured image and the second portion of the captured image is performed utilizing a scale-invariant feature transform algorithm.

In some embodiments, the memory stores program instructions that further cause the processor to calibrate the system. The memory can also store program instructions that further cause the processor generate a table of correspondence between captured image pixel locations and panorama pixel locations. In some embodiments, the memory stores program instructions that further cause the processor utilize the detector to capture the first portion of the image and capture the second portion of the image simultaneously.

An exemplary method of the disclosed subject matter for capturing a panoramic image of a field of view includes positioning a mirror a first distance from a fisheye lens, utilizing the fisheye lens to capture a first portion of the image of the field of view transmitted directly through the fisheye lens, utilizing the fisheye lens to capture a second portion of the image of the field of view reflected from the mirror through the fisheye lens, and stitching together the first and second images to compose a panoramic image. The method can further include locating image pixels correspondingly found in both the first and second portions of the captured image, determining calibration settings for the mirror, determining calibration settings for the fisheye lens, and generating a table of correspondence between a pixel location on the captured image and a pixel location on the panoramic image.

In some embodiments, the capture of the first and second portions of the image are performed further utilizing a detector. The capture of the first and second portions of the image can be performed simultaneously, and stitching together the first and second portions of the image can be performed utilizing a scale-invariant feature transform algorithm. The determination of calibration setting for the mirror can be performed by determining the center of curvature and the orientation of the mirror. The determination of calibration setting for the fisheye lens can be performed by determining the projection function of the fisheye lens.

In some embodiments, the generation of a table of correspondence between a pixel location on the captured image and a pixel location on the panoramic image further includes determining an image location of the pixels, calculating a corresponding panorama location for the pixels located in the first portion of the captured image, calculating a corresponding panorama location for the pixels located in the second portion of the captured image, and calculating a corresponding panorama location for the pixels located in both the first and second portions of the image. The calculation of the corresponding panorama location for the pixels located in both the first and second portions of the captured image can further include using a smoothing technique to calculate the corresponding panorama location for the pixels located in both the first and second portions of the captured image. The stitching together the first and second portions of the captured image to compose a panoramic image can further include using the correspondence table to map the first and second portions of the captured image into a panoramic image.

BRIEF DESCRIPTION OF THE DRAWINGS

The accompanying drawings, which are incorporated and constitute part of this disclosure, illustrate embodiments of the disclosed subject matter.

FIG. 3 is an exemplary design of a system for panoramic imaging in accordance with an embodiment of the disclosed subject matter.

FIG. 4(a) is an image of an exemplary system for panoramic imaging in accordance with an embodiment of the disclosed subject matter.

FIG. 4(b) is an image of an exemplary mirror assembly for use with a panoramic imaging system in accordance with an embodiment of the disclosed subject matter.

DETAILED DESCRIPTION

The systems and methods described herein are useful for panoramic imaging both above and below the horizon. The disclosed subject matter provides a simple and compact system utilizing a fisheye lens and a mirror to capture overlapping panoramic images spanning the horizon. Those images are then stitched together to form a single, high resolution panoramic image of the selected areas of greatest interest to the user.

Figure 1:
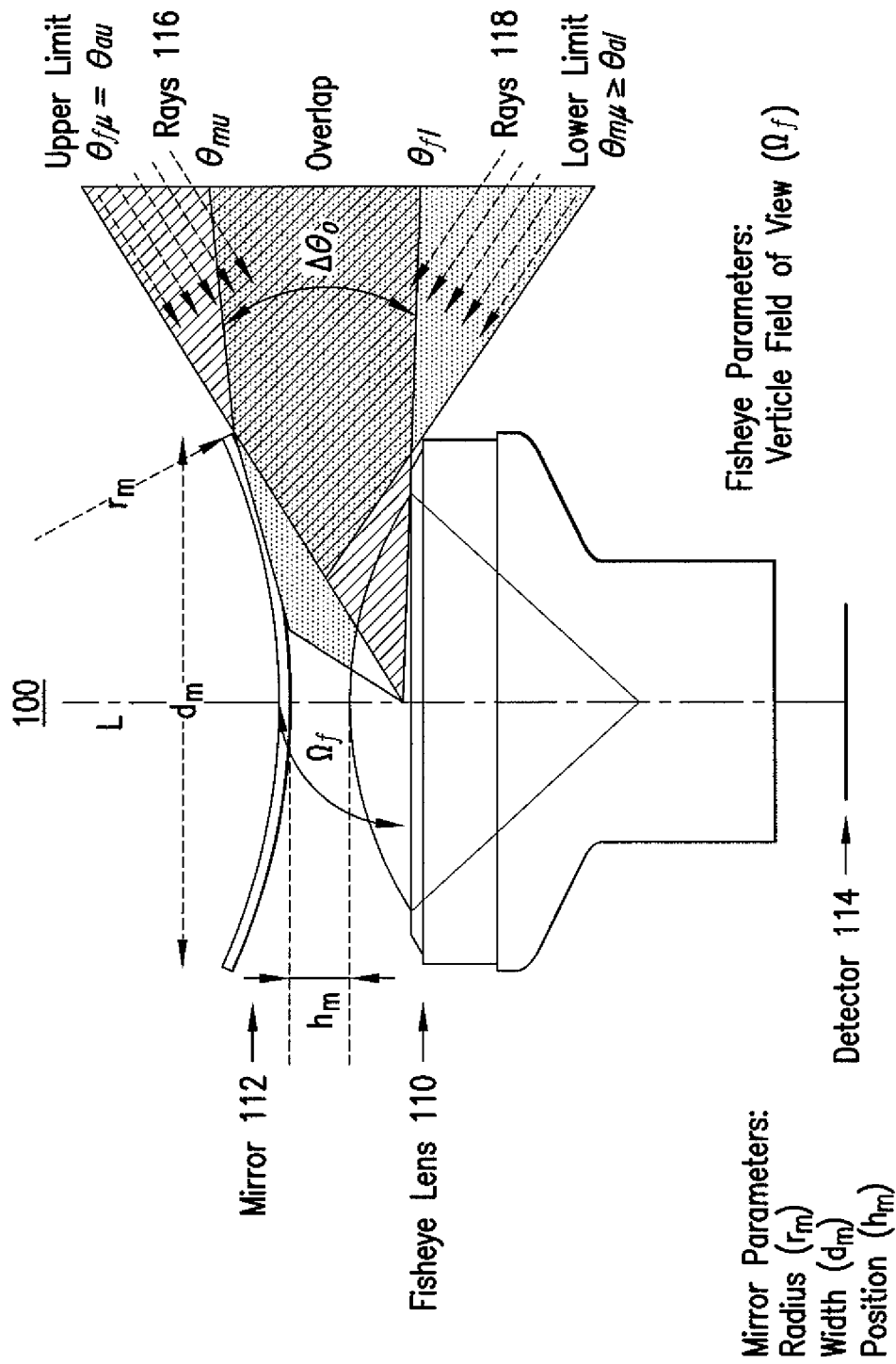
FIG. 1 is a diagram of a system for panoramic imaging in accordance with an embodiment of the disclosed subject matter.

FIG. 1 illustrates an exemplary design of a system 100 for panoramic imaging in accordance with the disclosed subject matter. The system 100 includes a fisheye lens 110 optically coupled to a mirror 112. A detector 114, e.g., a 7 frame/sec Lumnera Lw570 digital video camera with a 5 megapixel sensor, can be utilized to capture an image of light rays 116 directly incident upon the fisheye lens 110 and light rays 118 reflected from mirror 112 through fisheye lens 110. All of the angles represented in FIG. 1 are measured from the vertical center line L, unless indicated otherwise.

Mirror 112 has the characteristics of a diameter $d_m$, e.g., 50.26 mm, and a radius $r_m$, e.g., 70.12 mm. The mirror 112 can be positioned at a distance $h_m$, e.g., 2.6 mm. Fisheye lens 110 has the characteristics of a vertical field of view of $\Omega_f$, e.g., 97.5° (the field of view of a fisheye lens is usually twice its vertical coverage, e.g., a 180° fisheye lens covers 90° in the vertical direction). The fisheye lens 110 can be any commercially available fisheye lens, e.g., a Fujinon FE185C046HA-1 fisheye lens with a manufacturers listed field of view of 185° (with a measured field of view of 195°), or alternatively it can be a custom made fisheye lens.

FIG. 1 further illustrates that fisheye lens 110 can have a field of view extending from the fisheye lower limit $\theta_{fl}$ to the fisheye upper limit $\theta_{fu}$. Mirror 112 can have a field of view extending from the mirror lower limit $\theta_{ml}$ to the mirror upper limit $\theta_{mu}$. The system 100 can have an overall field of view extending from the lower limit $\theta_{al}$, e.g., 120°, to the upper limit $\theta_{au}$, e.g., 65°, for a total panoramic field of view $\Delta\theta_a = (\theta_{al} - \theta_{au})$, e.g., 55°, where $\theta_{au} = \theta_{fu}$ and $\theta_{al} \geq \theta_{ml}$ in an exemplary embodiment. The system 100 can have an overlap $\Delta\theta_o$ in the fields of view of the fisheye lens 110 and the mirror 112, such that $\Delta\theta_o = (\theta_{fl} - \theta_{mu})$.

In one exemplary embodiment, an overlap $\Delta\theta_o$ of 20-30 pixels can be sufficient for blending. Alternatively, if the size of detector is much small than the overlap $\Delta\theta_o$ can be 20°. The system 100 is thus defined by the parameters:

$$\theta_{au} = \theta_{fu} \tag{1a}$$

$$\theta_{ml} \geq \theta_{al} \tag{1b}$$

$$\Delta\theta_o = (\theta_{fl} - \theta_{mu}) \quad (1c)$$

Furthermore, the lower field of view angle for the fisheye lens, $\theta_{fl}$, satisfies the requirement that $\theta_{fl} = \Omega_f/2$. Parameters (1a) and (1b) state that the mirror and the lens should be positioned such that neither obstruct the panoramic field of view, and parameter (1c) ensures that no part of the desired panoramic field of view is omitted from the captured image. Thus, parameters (1a)-(1c) can be set such that the desired panoramic field of view is captured by the detector 114.

Figure 2B:
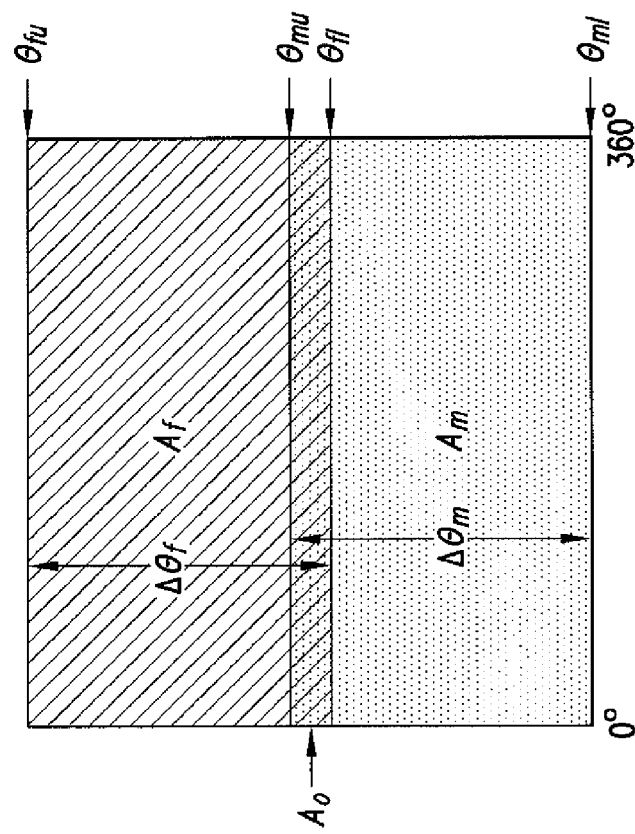
FIG. 2(b) illustrates an panoramic view of a field of view captured by a detector in accordance with an embodiment of the disclosed subject matter.

FIG. 2(*a*) illustrates an overall field of view, as captured by detector 114, for an exemplary embodiment of the disclosed subject matter. Area $A_f$ represents the image captured from light rays directly incident upon fisheye lens 110, while area $A_m$ represents the image captured from light rays reflected from mirror 112. As shown in FIG. 2(*a*), area $A_f$ has an angular width of $\Delta\theta_f = (\theta_{fu} - \theta_{fl})$ and area $A_m$ has an angular width of $\Delta\theta_m = (\theta_{mu} - \theta_{ml})$. Areas $A_o$ represents the overlap of areas $A_f$ and $A_m$, and have an angular widths of $\Delta\theta_o = (\theta_{fl} - \theta_{mu})$. Though FIG. 2(*a*) shows two separate areas $A_o$, those skilled in the art will appreciated that these two areas in fact depict the same image. FIG. 2(*b*) illustrates an unwrapped panorama view of the field of view represented in FIG. 2(*a*).

FIG. 3 shows an exemplary panoramic imaging system designed in accordance with the disclosed subject matter. The cata-fisheye concept allows for a camera designs with a wide range of fields of view by varying the parameters (e.g., shape and position) of mirror 112 and the field of view of fisheye lens 110. In accordance with the disclosed subject matter, mirror 112 can have a wide range of shapes, e.g., spherical, paraboloidal, hyperboloidal, conical, or even a complex aspherical shape. In one exemplary embodiment, mirror 112 is a spherical mirror. In the same or another embodiment, mirror 112 is coaxial with fisheye lens 110.

FIG. 4(*a*) illustrates an exemplary embodiment of system 100. As illustrated in FIG. 4(*a*), the total size of the system can be 10 cm high by 7 cm wide by 5.5 cm deep. As shown in FIGS. 4(*a*)-(*b*), mirror 112 is part of a mirror assembly 410. In one embodiment, mirror assembly 410 can be a detachable unit, as shown in FIG. 4(*b*), which can be secured to the system 100 by various attachment means, e.g., by screw threads. The mirror assembly 410 can be composed of a top and a cylindrical transparent wall which can have screw threads on the attaching edge, for securing mirror assembly 410 to panoramic imaging system 100. Exemplary system 100 is further connected to a processing unit (not shown), e.g., a standard desktop computer, by a connector 412 that is compatible with detector 114, e.g., a standard USB cable.

Another design parameter that can be set is the amount of overlap between the upper and lower views. Since the stitching of the two views takes place in the panoramic image, the overlap can be specified in terms of a number of pixels, $p_o$. The corresponding angular overlap for the two fields of view is expressed by:

$$\Delta\theta_o = \Omega_f/2 - f^{-1}[f(\Omega_f/2) - p_o]. \quad (2)$$

Here, $r = f(\theta)$ is the projection function of the fisheye lens, where r is the radial distance of a pixel from the image center and $\theta$ is the elevation angle of the incident ray with respect to the optical axis of the fisheye lens.

In one exemplary design, fisheye lens 110 is assumed to have a single viewpoint positioned at origin O, as shown in FIG. 3. Though at present fisheye lenses do not exactly have a single viewpoint, any problems arising as a result of this assumption can be solved by adding tolerances to the limits of the desired field of view. Continuing with FIG. 3, $h_l$ is the distance between O and the tip of the fisheye lens 110 and $d_l$ is the width of the fisheye lens 110 including its casing. In an exemplary embodiment, spherical mirror 112 has a radius of curvature $r_m$ and width $d_m$ which are to be determined, and is positioned at a chosen distance $h_m$ from the lens.

As shown in FIG. 3, P is a point on the rim of mirror 112. In one exemplary embodiment and according to the parameters 1(a)-(c), set forth above, the position of P and the surface normal $\hat{n}$ at P (and hence the radius and center of curvature of mirror 112) are such that an incoming ray 120, at angle $\theta_{mu}$, is reflected by P towards O. This condition is satisfied if the directional angle $\theta_{\hat{n}}$ at P satisfies:

$$\theta_{\hat{n}} = \frac{1}{2}(\pi + \theta_{fu} + \theta_{mu}). \quad (3)$$

From the above, the radius of curvature and the width of the mirror are determined by:

$$r_m = \frac{(h_m + h_l)\sin\theta_{fu}}{\sin(\theta_{fu} - \theta_{\hat{n}}) - \sin\theta_{fu}}, \quad (4)$$

$$d_m = \frac{2(h_m + h_l)\sin\theta_{\hat{n}}\theta_{fu}}{\sin(\theta_{fu} - \theta_{\hat{n}}) - \sin\theta_{fu}}. \quad (5)$$

In this exemplary embodiment, the radius of curvature $r_m$ and the width $d_m$ are computed as a function of the position $h_m$ of mirror 112 with respect to fisheye lens 110. While any arbitrary position $h_m$ and a mirror 112 with corresponding radius of curvature $r_m$ and width $d_m$ can satisfy the upper limit parameter (1a) and the overlap parameter (1c), that does not necessarily ensure that the fisheye lens 110 will not obstruct the desired panoramic field of view (e.g., parameter (1b)). To determine the smallest $h_m$ for which $\theta_{ml} \geq \theta_{al}$ linear search can be used, for example, by using a well known iterative method utilizing the above equations.

A person skilled in the art will appreciate that there are several design solutions for a desired panoramic field of view based upon the field of view of fisheye lens 110 and the desired overlap $\Delta\theta_o$ between the upper and lower views. Table 1 illustrates exemplary solutions for five different fisheye lens fields of view:

TABLE 1

| Panorama FOV | Fisheye FOV | Design Solution (in mm) | | |
|---|---|---|---|---|
| (Required) | (Chosen) | $r_m$ | $d_m$ | $h_m$ |
| +30° to −30° | 170° | 70.00 | 47.88 | 4.6 |
| (60° to 120°) | 180° | 76.36 | 44.45 | 4.5 |
| | 190° | 81.49 | 42.18 | 4.4 |
| | 200° | 96.22 | 39.73 | 4.2 |
| | 210° | 106.98 | 37.15 | 4.1 |

Figure 5:
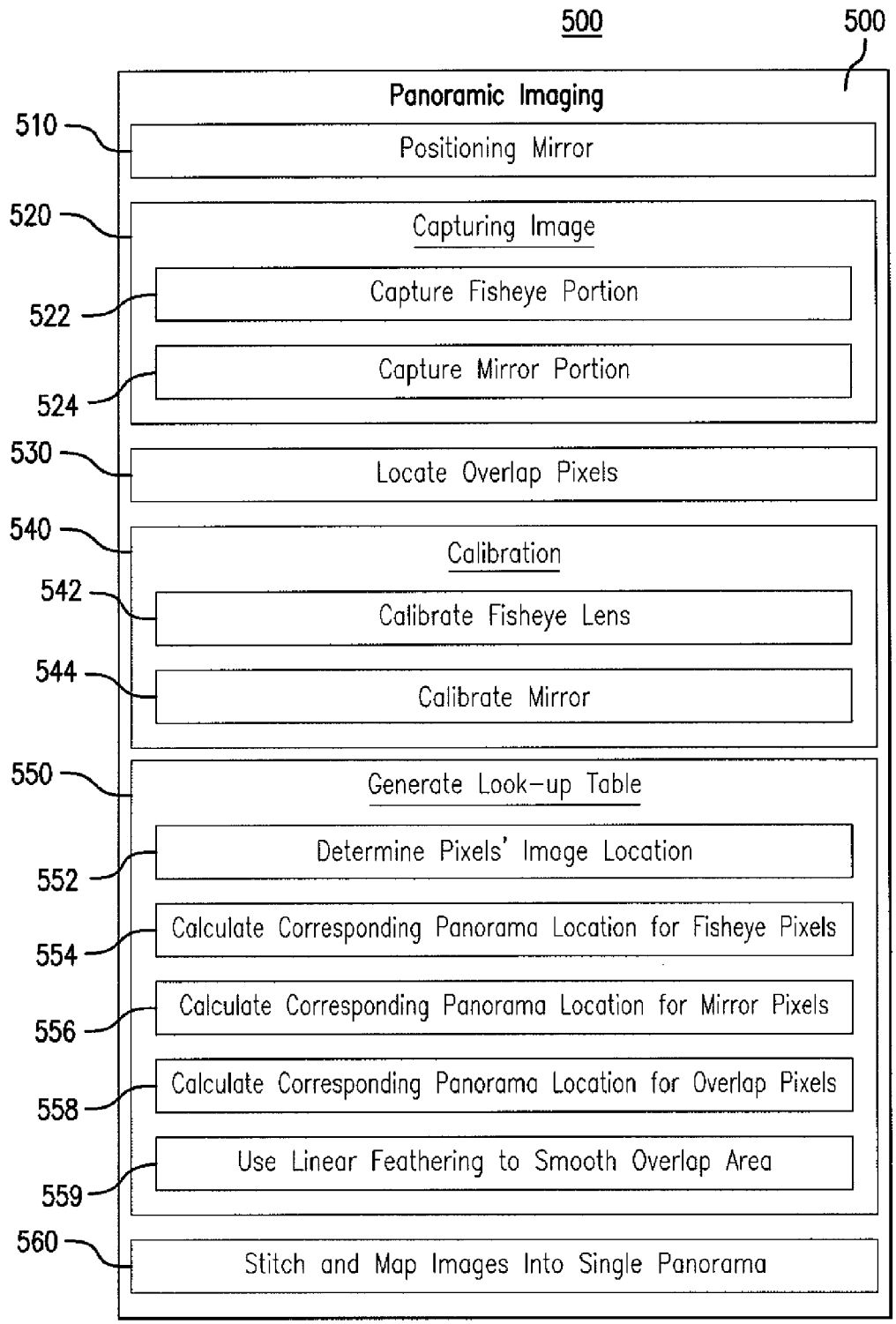
FIG. 5 is an exemplary chart of a method for panoramic imaging in accordance with an embodiment of the disclosed subject matter.

FIG. 5 illustrates an exemplary method 500 for panoramic imaging in accordance with the disclosed subject matter. In one embodiment, mirror 112 is position 510 and an image is captured 520. The portion of the image comprising the light directly incident upon the fisheye lens 110 can be captured 522 separately from the capture 524 of the portion of the image comprising the light reflected from mirror 112 or both portions can be captured 520 simultaneously. The portions are captured 520 utilizing the detector 114. Upon capturing 520 the image, in an exemplary embodiment, the location of a number of pixels located in both the fisheye and mirror images are determined 530. This determination 530 is made, for example, by utilizing a feature specific algorithm, e.g., a scale-invariant feature transform (SIFT) algorithm.

In one exemplary embodiment, once the design parameters for the imaging system 100 have been selected the system 100 is calibrated 540. In order to geometrically map the captured image to the upper and lower panoramas and then stitch them, it is useful to known the relationship between the light rays entering the camera and the pixels in the captured image. This computation is governed by the design parameters; however, the actual position and orientation of the mirror may not adhere strictly to the design specifications, as a result of manufacturing tolerances. Another factor is the possible inaccuracy in the assumed position fisheye lens viewpoint O. As a result, calibration 540 of the system 100 is performed by calibrating 542 fisheye lens 110 and by calibrating 544 mirror 112. In one exemplary embodiment, calibration 542 of fisheye lens 110 is performed by determining the fisheye projection function $r=f(\theta)$, and calibration 544 of mirror 112 is performed by determining the actual center of curvature $(x_m, y_m, z_m)$ and orientation $\alpha_m, \beta_m$ of mirror 112. To calibrate 542 fisheye lens 110, a projection function provided by the manufacturer can be used, or any of the other calibration methods that are well known in the art can be employed.

Figure 6:
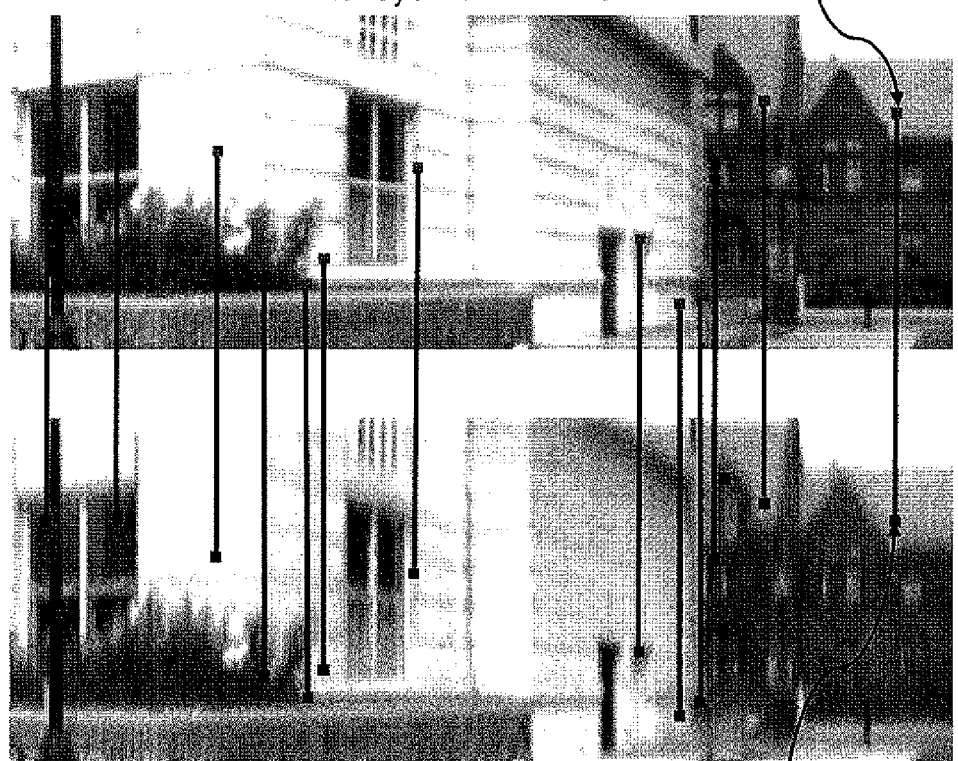
FIG. 6 is a combined image of a mirror-panoramic and fisheye-panoramic of an overlap area illustrating overlap features in accordance with an embodiment of the disclosed subject matter.

In an exemplary embodiment, calibration 544 of mirror 112 is performed by searching for a solution $\tilde{M}=(x_m, y_m, z_m, \alpha_m \beta_m)$ in an $R^5$ space (M) for which corresponding local features in the overlapping fields of view of the two views are aligned in the panoramic space. The camera is first placed in an environment with a large number of distant features, particularly in the overlapping region. Nearby features should be avoided as they would have larger parallax and hence tend to introduce errors in the alignment process. The solution is initialized to the design values, $\tilde{M}=(0,0,h_m+h_l,0,0)$, and then, as shown in FIG. 6, a mirror-panorama 610 and a fisheye-panorama 612 are generated for the overlapping region. As shown in FIG. 6, a program, e.g., a program running a scale-invariant feature transform (SIFT) algorithm, is used to determine 530 a corresponding set of features from the two panoramas 610, 612. An extracted feature can be represented in spherical coordinates. In a pruned feature set, let the ith feature in the mirror-panorama 610 be denoted by $F_m^{(i)}=[\theta_m^{(i)}, \phi_m^{(i)}]$ and the corresponding feature in the fisheye-panorama 612 be denoted by $F_f^{(i)}=[\theta_f^{(i)},\phi_f^{(i)}]$. The problem of finding the solution $\tilde{M}$ can then be setup as a minimization of an objective function that is the sum of the square of the errors in the alignment of the corresponding features:

$$\operatorname*{argmin}_{\tilde{M}} \sum \left[F_f^{(i)} - F_m^{(i)}(\tilde{M})\right]^2. \tag{6}$$

During this optimization, it is not necessarily required to search for the solution in the entire $R^5$ space. Rather a small interval $\Delta M$ centered at the ideal design parameter values can be searched for instead. In one embodiment, the size of the interval $\Delta M$ is chosen based on the manufacturing tolerances and the ambiguity in the position of fisheye lens viewpoint O.

Figure 2A:
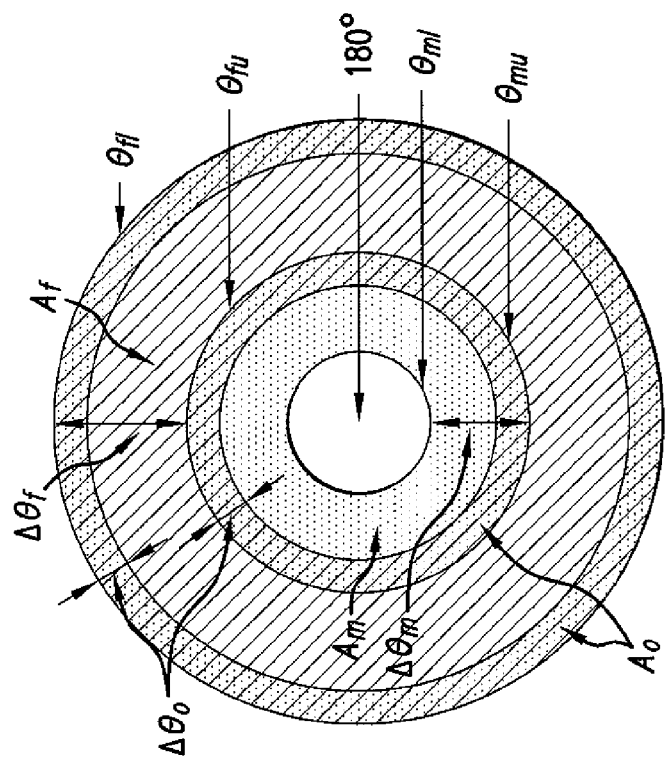
FIG. 2(a) illustrates of a field of view captured by a detector in accordance with an embodiment of the disclosed subject matter.

Continuing with FIG. 5, in one exemplary embodiment, once the system 100 has been calibrated 540 a look-up table is generated 550. Each pixel in the panorama can be represented by a spherical coordinate/direction. The corresponding location for each pixel is then found 552 in the captured image. Referring to FIG. 2(a), each panorama pixel $(\theta_p,\phi_p)$ may lie in one of at least three different areas: (i) it may lie in the direct field of view of fisheye lens 110 (area $A_f$), (ii) it may lie in the field of view of mirror 112 (area $A_m$), or (iii) it may lie both in the direct field of view of fisheye lens 110 and in the field of view of mirror 112 (overlap area $A_o$). If $(\theta_p,\phi_p)$ is in the field of view of fisheye lens 110, then its corresponding location in the captured image is calculated 554 by $$(f(\theta_p)\cos \phi_p, f(\theta_p)\sin \phi_p) \tag{7}$$

where $f(\theta_p)$ is the fisheye projection function, discussed above.

If the pixel is in the field of view of mirror 112, then its corresponding location in the captured image is calculated 556 by solving for the outgoing ray $(\theta_c,\phi_c)$ from fisheye lens 110 which would finally proceed in the pixel $(\theta_p,\phi_p)$'s direction after being reflected by mirror 112. This is a non-liner problem and can be solved as follows. Let $R(\theta,\phi)$ be the direction in which a ray $(\theta,\phi)$ from the origin O would proceed after being reflected by mirror 112. Then, the following optimization equation solves for $(\theta_c,\phi_c)$ in a least squares sense:

$$\operatorname*{argmin}_{(\theta_c,\phi_c)}[(\theta_p, \phi_p) - R(\theta_c, \phi_c)]^2. \tag{8}$$

The image location can then be given by:

$$(f(\theta_c)\cos \phi_c, f(\theta_c)\sin \phi_c). \tag{9}$$

Though solving the above problem for each pixel in the field of view of mirror 112 can be computationally expensive, it is not necessary because the reflecting point on mirror 112 varies smoothly with the incoming ray direction, and therefore, the above can be solved for discrete intervals and interpolated for the in-between pixels.

If the pixel lies in the overlapping region, its location in the panorama is calculated 558 by both of the above methods and a linear feathering technique can be used 559 to smooth the blending. The entire mapping between the panorama and the captured image is then used to generate 550 look-up table. The look-up table is then used to map 560 captured images to high resolution panoramas in real time, enabling real time video applications. The calibration process and the mapping calculations are performed once for any given system 100, and do not need to be repeated unless there is some change in the system configuration.

It will be understood that the foregoing is only illustrative of the principles described herein, and that various modifications can be made by those skilled in the art without departing from the scope and spirit of the disclosed subject matter. For example, the system and methods described herein are used for panoramic imaging. It is understood that that techniques described herein are useful in connection with still imaging and video imaging. Moreover, features of embodiments described herein may be combined and/or rearranged to create new embodiments.

We claim:

1. A system for capturing a panoramic image of a panoramic field of view, comprising:
  a fisheye lens having a direct field of view;
  a mirror having a mirror field of view and being optically coupled to the fisheye lens for reflecting an image of the mirror field of view through the fisheye lens;
  a detector, optically coupled to the fisheye lens and the mirror, for capturing a first portion of the panoramic image corresponding to the direct field of view and a second portion of the panoramic image corresponding to the mirror field of view, the first and second portions of the panoramic image each having a portion overlapping the other portion;

a processor operatively coupled to the detector; and
a memory operatively coupled to the processor, the memory storing program instructions that when executed by the processor, cause the processor to:
receive the captured first and second portions of the panoramic image from the detector,
combine the first and second portions of the panoramic image to form the panoramic image, and
smooth the overlapping portion of the first and second portions of the panoramic image by feathering.

2. The system of claim 1, wherein the mirror is a spherical mirror.

3. The system of claim 1, wherein the mirror is positioned coaxially with regard to the fisheye lens.

4. The system of claim 1,
wherein, an upper angle of the panoramic field of view is equal to an upper angle of the direct field of view;
a lower angle of the panoramic field of view is less than or equal to a lower angle of the mirror field of view; and
an angle of overlap between the direct field of view and the mirror field of view is equal to the difference between a lower angle of the direct field of view and an upper angle of the mirror field of view.

5. The system of claim 1, wherein the first portion of the panoramic image and the second portion of the panoramic image are combined using a scale-invariant feature transform algorithm.

6. The system of claim 1, wherein the memory stores program instructions that when executed by the processor, further cause the processor to calibrate the system.

7. The system of claim 1, wherein the memory stores program instructions that when executed by the processor, further cause the processor generate a table of correspondence between captured image pixel locations and panorama pixel locations.

8. The system of claim 1, wherein the memory stores program instructions that when executed by the processor, further cause the processor utilize the detector to capture the first portion of the panoramic image and capture the second portion of the panoramic image simultaneously.

9. A method for capturing a panoramic image of a panoramic field of view, comprising:
positioning a mirror having a mirror field of view a first distance from a fisheye lens having a direct field of view;
utilizing the fisheye lens to capture a first portion of the panoramic image corresponding to the direct field of view received directly through the fisheye lens;
utilizing the fisheye lens to capture a second portion of the panoramic image corresponding to the mirror field of view reflected from the mirror through the fisheye lens, the first and second portions of the panoramic image each having a portion overlapping the other portion;
combining the first and second portions of the panoramic image to compose the panoramic image; and
smoothing the overlapping portion of the first and second portions of the panoramic image by feathering.

10. The method of claim 9, further comprising:
locating one or more image pixels correspondingly found in both the first and second portions of the panoramic image;
determining calibration settings for the mirror;
determining calibration settings for the fisheye lens; and
generating a table of correspondence between a pixel location on the first portion of the panoramic image and a pixel location on the second portion of the panoramic image.

11. The method of claim 9, wherein the first and second portions of the panoramic image are captured utilizing a detector.

12. The method of claim 9, wherein the first and second portions of the panoramic image are captured simultaneously.

13. The method of claim 10, wherein the first and second portions of the panoramic image are combined utilizing a scale-invariant feature transform algorithm.

14. The method of claim 10, wherein determining the calibration settings for the mirror includes determining the center of curvature and the orientation of the mirror.

15. The method of claim 10, wherein determining the calibration settings for the fisheye lens includes determining a projection function of the fisheye lens.

16. The method of claim 10, wherein generating the table of correspondence further comprises:
determining an image location of one or more pixels;
calculating a corresponding panorama location for one or more pixels located only in the first portion of the panoramic image;
calculating a corresponding panorama location for one or more pixels located in only the second portion of the panoramic image; and
calculating a corresponding panorama location for one or more pixels located in both the first and second portions of the panoramic image.

17. The method of claim 10, wherein combining the first and second portions of the panoramic image further comprises using the correspondence table to map the first and second portions of the panoramic image into the panoramic image.

18. A system for capturing a panoramic image of a panoramic field of view, comprising:
a means for optically receiving a first portion of the panoramic image corresponding to a direct field of view;
a means for optically reflecting a second portion of the panoramic image corresponding to a mirror field of view through the means for optically receiving the first portion of the panoramic image;
a means for capturing the first and second portions of the panoramic image, the first and second portions of the panoramic image each having a portion overlapping the other portion;
a means for combining the first and second portions of the panoramic image to compose the panoramic image; and
a means for smoothing the overlapping portions of the first and second portions of the panoramic image by feathering.

19. The system of claim 18, wherein the means for optically receiving the first portion of the panoramic image is a fisheye lens.

20. The system of claim 18, wherein the means for optically reflecting the second portion of the panoramic image is a mirror.

21. The system of claim 18, wherein the means for capturing the first and second portions of the panoramic image is a detector.

22. The system of claim 18, wherein the means for combining the first and second portions of the panoramic image is a processor operatively coupled to a memory, the memory storing program instructions that when executed by the processor, cause the processor combine the first and second portions of the panoramic image to compose the panoramic image.

* * * * *